Patented Sept. 5, 1939

2,172,118

UNITED STATES PATENT OFFICE 2,172,118

MANUFACTURE OF MASSAGE CREAMS

Ida G. Blish, Washington, D. C.

No Drawing. Application June 25, 1936,
Serial No. 87,317

4 Claims. (Cl. 167—91)

The invention to which the following description relates is that of a novel compound for use in reducing fatty tissue by message. Persons desiring to remove excess fatty tissue, massage for the purpose of breaking down the fatty tissue and assisting in its ultimate reduction or removal. In treatments of this kind much benefit is derived by the use of a paste or cream which will facilitate massage. Such a compound must be of a type which will be practically fluent at body temperature and yet be unharmful. The intention of course is to cover the surface of the skin, reduce the friction of massage, lubricate the skin to a certain degree but without opening the pores more than is necessary. Such a compound during its use, will evaporate its volatile content and leave a residue in the form of a wax, gum or other plastic material. This material during treatment or massage will readily form rolls or threads which break off.

Alcoholic solutions are good media in which to carry such waxes, gums and the like. Difficulties arise in combining such alcoholic solutions with toilet creams, however, as the latter interfere with the capacity of the alcoholic solution to carry the necessary waxes or their equivalent.

One of the objects of my invention is to so modify the compound as to insure the satisfactory blending of the alcoholic solution with its wax and gum content in the cream.

The tendency of any cream to penetrate the pores of the skin is also a detriment when the cream is to be used in reducing treatments. One of the features of my invention is the addition of a mild organic acid such as acetic, citric or tartaric acids which have the incidental effect of astringents, closing the pores of the skin against the undue absorption of the cream. The principal effect of the organic acid, however, is to produce a satisfactory "rollable" film on the skin during treatment.

I prefer to form my novel compound by first preparing a toilet cream base of which the following is the preferred composition.

I melt together 12 parts of stearic acid and 2 parts of glycol stearate and to that add a warm solution of 12 parts of glycerine and ½ part potassium hydroxide in 30 parts of water. This mixture is then rendered slightly alkaline by the addition of 1½ parts ammonia water and heated with stirring until a uniform creamy consistency is obtained.

I may also at this point add 30 parts of water containing 1 part of powdered acacia and $\frac{1}{10}$ of a part of boric acid. This will produce a satisfactory toilet cream base.

As a medium for carrying waxes or gums, I use a solution of alcohol (80 parts calculated as anhydrous), 1 part of sodium stearate and 1 part of sodium benzoate. It is now necessary to add a waxy compound which may be supplied in the form of a solution containing 10 parts of acetone, 10 parts of ethyl methyl ketone, 1 part of ethyl cellulose, 3 parts spermaceti, 2 parts beeswax and 1 part ceresin, completely dissolved by heating. To the alcoholic solution, which is essentially a so-called rubbing alcohol, is added 2 parts of white vinegar or an equivalent amount of a low molecular fruit acid, such as citric acid, acetic acid or tartaric acid while the mixture is being stirred.

This alcoholic solution with the waxy compound and the addition of vinegar or equivalent acid as just described may then be combined with the toilet cream base, the 2 parts of white vinegar or equivalent acid avoiding the destruction of the creamy consistency.

The menstruum used is evidently predominantly alcoholic. The final composition is essentially the blend of a toilet cream and a rubbing alcohol containing sufficient low-molecular fruit acid to form a rollable film when the composition is used as a rubbing compound.

In carrying out the above procedure it is found that some variation in ingredients is permissible and satisfactory. For example, a high-molecular fatty acid such as palmitic acid is an alternative substituent for stearic acid and in place of potassium hydroxide, sodium hydroxide or a similar substance may be used. In like manner propyl or isopropyl alcohol may be substituted for the ordinary ethyl alcohol and glycols may be substituted for glycerine. The formula also operates satisfactorily when alcohol-soluble, nitro-cotton or other cellulose esters and ethers are used in place of the ethyl cellulose. Cellosolve, that is, the ethyl ether of ethylene glycol, may be added.

Other waxes equally effective are paraffin, Chinese wax, ozokerite or any similar waxy material of similar consistency.

Any suitable perfumes and coloring may be used.

The product of this invention is a stable creamy substance very pleasant to the touch. It may be poured into jars, tubes or the like and will remain substantially stable. It is easily picked up on the fingers but becomes fluent under the temperatures of the skin. A light coat of this cream spread over the skin becomes almost liquid. It then evaporates and this evaporation is hastened by manipulation, massage or the like. During light massage the compound appears to be absorbed by the skin. However, this effect is superficial as the astringent present, vinegar or the like, prevents more than superficial penetration. As the material evaporates and by continued manipulation, the solid materials, principally waxes, form a very thin film that is quite smooth and slippery to the touch. Continued manipulation results in the waxes, gums and other solid materials rolling off the surface in the form of filaments and similar particles.

I attribute the effectiveness of the material principally to the presence of the astringent organic acid which serves to change an otherwise greasy or waxy cream to one which rapidly forms a "rollable" film on evaporation and manipulation. I have already pointed out the incidental advantage of this ingredient in acting as an astringent, checking the penetration of the cream in the skin. Use of this cream as an incident to treatments for reduction of fatty tissue has been found advantageous in that it improves the facility of manipulation and benefits the skin.

The above description of the preferred form of my invention and including the method of preparation is set forth for purposes of illustration only, and without limiting the invention other than as will appear from the scope of the following claims.

What I claim is:

1. A massage cream consisting substantially of a blend of the ingredients of a toilet cream and a rubbing alcohol and suitable for use as a lubricant in massage, comprising a high molecular fatty acid and the soap of a high-molecular fatty acid, compounded with a wax and a sufficient quantity of a readily volatile, alcoholic menstruum to produce a cream substantially fluent at body temperatures, said composition also containing a small amount of a low-molecular fruit acid in sufficient quantity to produce a surface film during use which rolls off the surface in the form of filaments.

2. The massage cream of claim 1 which also contains in solution a small amount of a cellulose compound of a group consisting of nitro-cotton and ethylcellulose and a solvent therefor.

3. In the manufacture of massage creams consisting substantially of a blend of the ingredients of a toilet cream and a rubbing alcohol and suitable for use as a lubricant in massage, the process which comprises preparing a toilet cream base containing a high-molecular fatty acid and the soap of a high-molecular fatty acid and mixing this base with a menstruum which is predominantly alcoholic and which contains a wax and a small amount of a low-molecular fruit acid in quantity sufficient to produce a surface film during the use of the composition which rolls off the surface in the form of filaments.

4. The process of claim 3 wherein said menstruum also contains a cellulose compound of a group consisting of nitro-cotton and ethylcellulose and a solvent therefor.

IDA G. BLISH.